United States Patent
Arimilli et al.

[11] Patent Number: 5,287,457
[45] Date of Patent: Feb. 15, 1994

[54] COMPUTER SYSTEM DMA TRANSFER

[75] Inventors: Ravi K. Arimilli, Round Rock; Sudhir Dhawan, Austin; James O. Nicholson, Austin; David W. Siegel, Austin, all of Tex.

[73] Assignee: International Business Machines Corporation, Armonk, N.Y.

[21] Appl. No.: 870,159

[22] Filed: Apr. 15, 1992

Related U.S. Application Data

[63] Continuation of Ser. No. 640,510, Jan. 10, 1991, abandoned, which is a continuation of Ser. No. 297,774, Jan. 13, 1989, abandoned.

[51] Int. Cl.[5] .................... G06F 13/14; G06F 15/16
[52] U.S. Cl. ................................ 395/200; 395/325; 395/550
[58] Field of Search .............. 364/DIG. 1, DIG. 2; 395/325, 200, 550

[56] References Cited

U.S. PATENT DOCUMENTS

| | | | |
|---|---|---|---|
| 3,752,933 | 8/1973 | Cohen et al. | 370/110.1 |
| 4,067,059 | 1/1978 | Derchak | 364/200 |
| 4,143,418 | 3/1979 | Hodge et al. | 364/200 |
| 4,231,086 | 10/1980 | Tarbox et al. | 364/200 |
| 4,399,503 | 8/1983 | Hawley | 364/200 |
| 4,479,195 | 10/1984 | Herr | 364/900 |
| 4,580,213 | 4/1986 | Hulett et al. | 364/200 |

*Primary Examiner*—David Y. Eng
*Attorney, Agent, or Firm*—Kenneth C. Hill; Andrew J. Dillon

[57] ABSTRACT

A DMA controller coupled to two separate buses controls the transfer of data between them. To effect a block data transfer, data is simultaneously read on one bus and written on the other. This allows data to be transferred between buses at the maximum transfer rate supported by the slower bus.

10 Claims, 3 Drawing Sheets

: 
COMPUTER SYSTEM DMA TRANSFER

This application is a continuation of application Ser. No. 07/640,510, filed Jan. 10, 1991 which is a continuation of 07/297,774 filed Jan. 13, 1989, both now abandoned.

CROSS REFERENCE TO RELATED APPLICATIONS

The subject matter of the present application is related to copending U.S. applications, Ser. No. 07/297,773, titled HIGH SPEED DATA TRANSFER ON A COMPUTER SYSTEM BUS, now U.S. Pat. No. 5,237,676 and Ser. No. 07/297,772, titled DATA TRANSFER USING BUS ADDRESS LINES, now U.S. Pat. No. 5,109,490 both filed on even data herewith and both assigned to the assignee hereof, and both of which are herein incorporated by reference.

BACKGROUND OF THE INVENTION

1. Technical Field

The present invention relates generally to computer systems, and more specifically to DMA transfers on computer systems.

2. Background Art

To improve computer system performance, direct memory access (DMA) devices are often used to transfer data between input output (I/O) devices and system memory. These devices provide for block data transfer in either direction. Typically, all that is required for a DMA transfer is control of the bus, a starting address, and a length of block count.

The standard DMA interface between memory and an I/O port works well when there is a direct, dedicated connection between the DMA controller and the I/O device. However, in some systems, such tight coupling between the DMA controller and the I/O devices is not possible. For example, in the System2 bus used in the IBM PS/2 series of microcomputers, also known as the microchannel bus, such close coupling between the I/O devices and the DMA controller connected to system memory is not possible. In these machines, there are actually two buses. A first bus, referred to as a system bus, connects the central processor, system main memory, and an I/O cache controller (IOCC) which includes the functions of a DMA device. Also attached to the IOCC is an I/O bus. It is this I/O bus which is referred to as the microchannel bus.

I/O devices which are to be attached to the system communicate through the I/O bus. They communicate only indirectly with the central processor and system memory through the IOCC. The IOCC then passes data transfers on to the central processor and system memory.

Since two separate buses are involved, the standard DMA configuration cannot be used. All of the I/O devices on the I/O bus reside in an I/O address space, and must be separately addressed by the IOCC. This means that the IOCC must generate an address to read an item of data from an I/O device, read that data item from the bus, generate an address on the system bus, and place the data item on the bus. This results in a system where the interface between the two separate buses, the IOCC, must read from one bus on one cycle and write to the other bus on the next cycle. This results in a certain amount of system inefficency since both buses are only operating at half capacity.

It would therefore be desirable to provide an interface between two buses which could improve DMA data transfer between an I/O device on one bus and a system memory on the other bus.

SUMMARY OF THE INVENTION

It is therefore an object of the present invention to provide for efficient block data transfers between a device attached to a first computer system bus and a device attached to a second computer system bus.

It is a further object of the present invention to provide such efficient block data transfers which allow data to be read on one bus simultaneously with writing data on the other bus.

It is another object of the present invention to provide such an efficient block data transfer which will accommodate a high speed block transfer mode in which data is transferred at a higher rate than provided for by a normal bus cycle on one bus.

Therefore in accordance with the present invention, a DMA controller coupled to two buses reads from one bus while writing to the other. Data transfer occurs during each clock cycle of each bus. Since no waits are required on either bus, high speed block transfer techniques which are available on a bus can be used to transfer block data efficiently.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

DETAILED DESCRIPTION OF THE PREFERRED EMBODIMENTS

Figure 1:
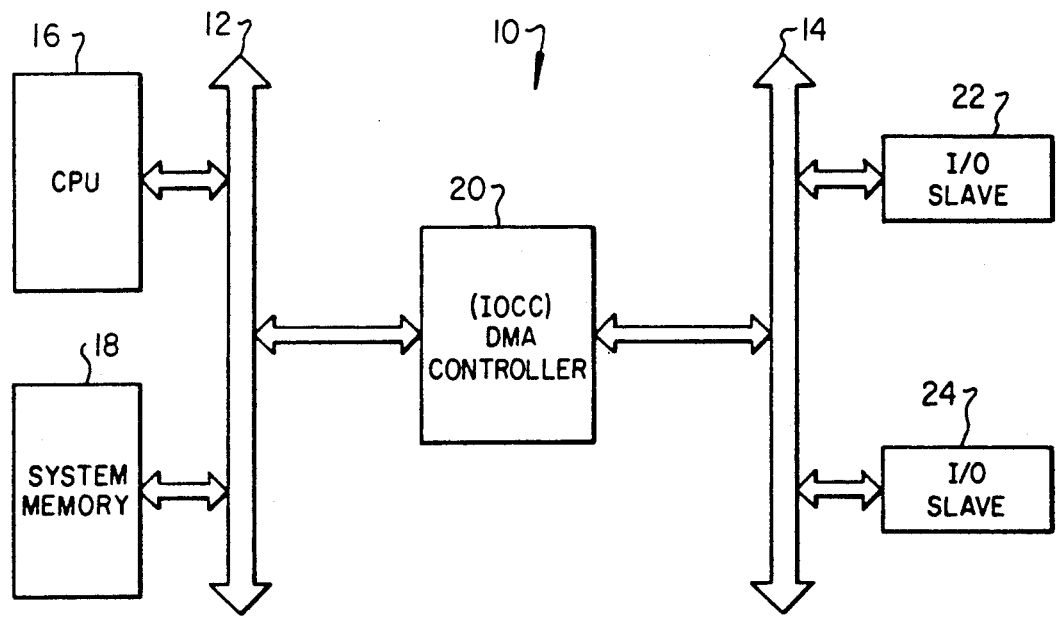
FIG. 1 is a block diagram of a computer system containing two buses.

FIG. 1 shows a block diagram of a computer system 10 which includes a main system bus 12 and an I/O bus 14. A central processor 16 is attached to the system bus 12, as is a main system memory 18.

An I/O cache controller (IOCC) 20 is connected to the system bus 12 and the I/O bus 14. The IOCC 20 performs a number of input output interface functions, including control of a small cache memory (not shown) used to buffer the I/O bus 14. The function of the IOCC 20 which is relevant to the present invention is its operation as a direct memory access (DMA) controller. In its function as a DMA controller, the IOCC 20 can transfer data directly to and from the system memory 18.

Also attached to the I/O bus 14 are I/O slave devices 22 and 24. The I/O slaves 22, 24 can be any devices suitable for attachment to the I/O bus 14. These can include, for example, video controllers, keyboard controllers, serial and parallel I/O ports, and disk controllers. Of special interest to the present invention are those devices, such as video controllers and disk controllers, which are capable of block data transfers.

Figure 2:
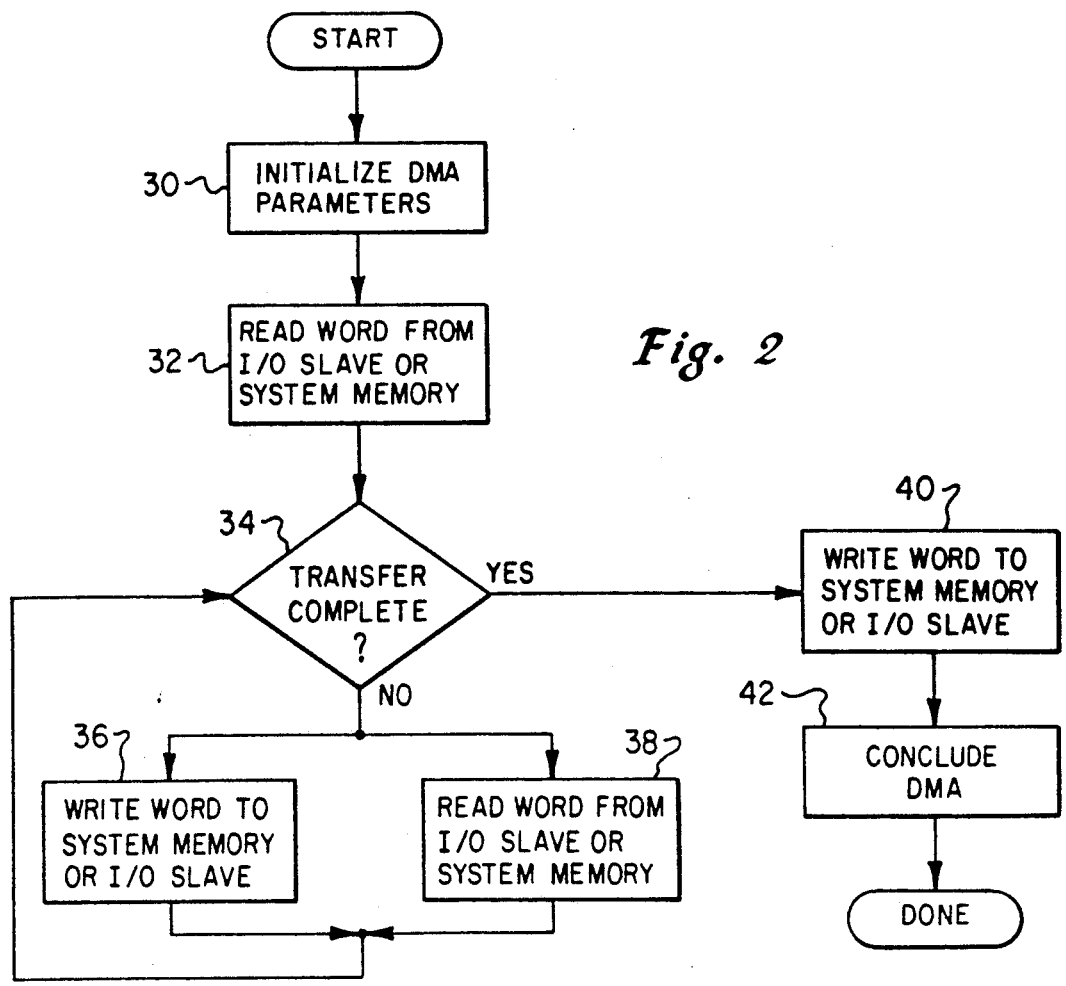
FIG. 2 is a flowchart illustrating a data transfer between devices on two separate buses according to the present invention.

A preferred method used by the IOCC 20 for transferring data between the system memory 18 and an I/O slave 22 or 24 is shown in FIG. 2. The first step is for the IOCC 20 to initialize the DMA parameters 30. Information typically needed for a DMA block transfer is the starting address and block length. This step also includes any necessary signalling to the system memory 18 and the device on the I/O bus 14 between which the transfer will be made.

The IOCC 20 then reads the first word to be transferred 32. If the transfer is from an I/O slave to the system memory 18, this word is read from the slave. If the transfer is from the system memory 18 to an I/O slave, this read is made from the system memory 18.

Next, a check is made 34 to see if the transfer is complete. It is possible to transfer only a single data word, but for longer blocks the test 34 will be negative.

If the transfer is not yet complete, the IOCC 20 simultaneously writes one word 36 and reads the next word to be transferred 38. One each of the write and read steps are performed on the system bus 12 and the I/O bus 14 simultaneously, depending upon the direction of data transfer. Flow of control then returns to step 34 to again test for the end of the transfer.

Once the transfer completes, control passes to step 40, which causes the last word to be written to the receiving device. The IOCC 20 then concludes the DMA 42 and the process is complete.

For the transfer described in FIG. 2, the system bus 12 and the I/O bus 14 may be of disparate types. If one bus is faster than the other, the maximum data throughput will of course be limited by the transfer speed of the slower bus. FIG. 2 as described is intended for systems in which the block data transfer rate of the two buses is the same. If one bus is significantly faster than the other, it is possible to include a buffer (not shown) in the IOCC 20 for buffering reads from or writes to that bus. Use of a buffer would allow transfers to be made to and from the faster bus at its normal operating speed, freeing some bus cycles for use by other devices.

Figure 3:
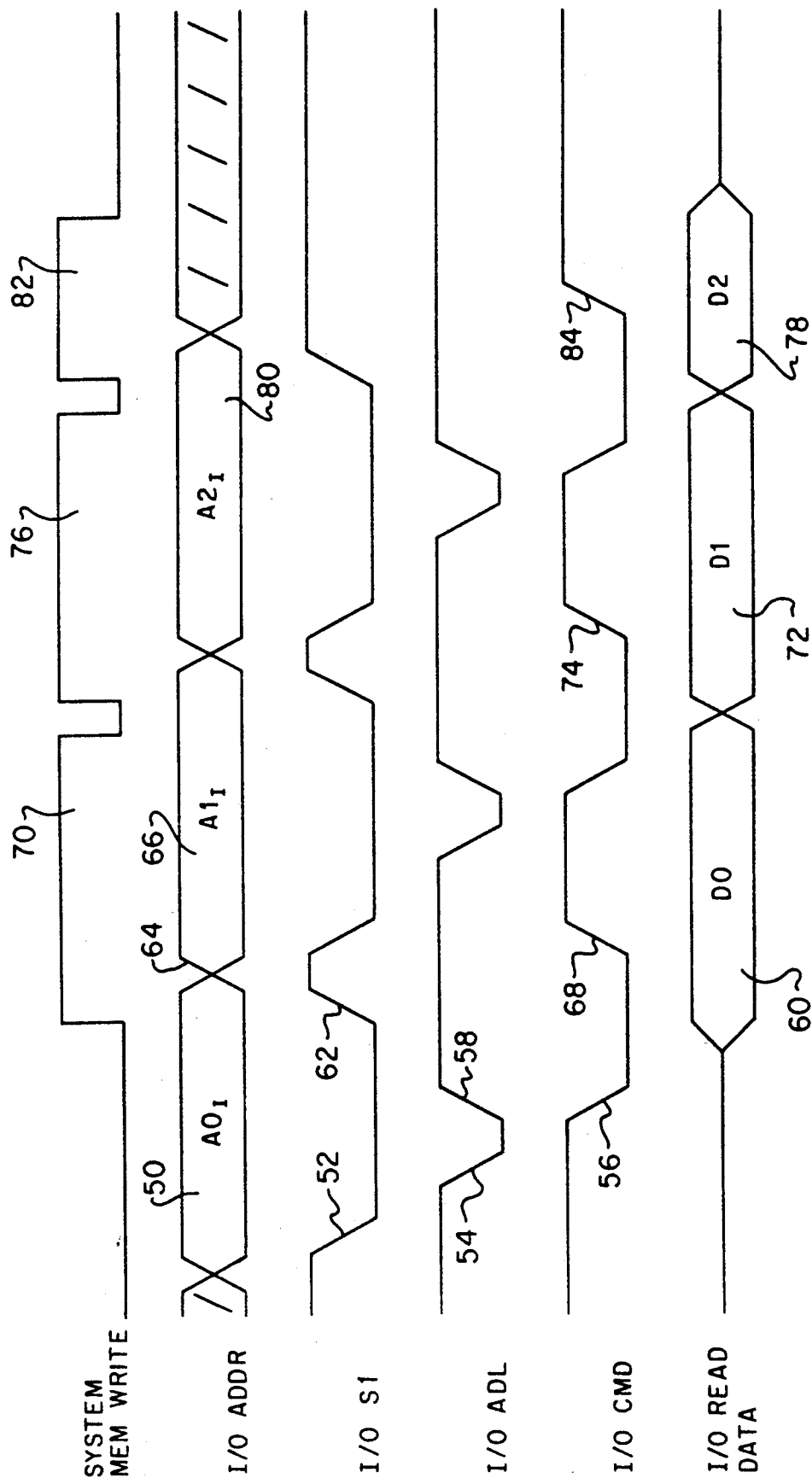
FIG. 3 is a timing diagram illustrating a data transfer according to the present invention.

FIG. 3 is a timing diagram illustrating a block data transfer from a device on the I/O bus to system memory 18. In the described embodiment, the I/O bus 14 is a System2 bus such as found in the IBM PS/2 family of microcomputers. The system bus 12 may be a system bus such as found in such microcomputers, or may be another system bus such as known in the art, including another System2 bus. The details of the operation of the system bus 12 are not part of the present invention.

In FIG. 3, only those bus signals necessary to describe the present invention are shown. Additional bus signals exist, and their function is described in detail in publicly available documents.

Referring to FIG. 3, the signal SYSTEM MEM WRITE indicates the time periods during which data is being transferred into the system memory 18 across the system bus 12. The signal SYSTEM MEM WRITE is not actually a bus signal; a high value indicates that bus activity to transfer data is taking place, while a low value indicates that no data transfer is occurring across the system bus 12.

The signal I/O ADDR is the address placed onto the I/O bus 14 by the IOCC 20. I/O Sl is a signal indicating that a read cycle is to take place on the I/O bus. I/O ADL is a signal meaning "address latch", and is used to latch address signals into devices attached to the I/O bus 14.

I/O CMD is the clock signal for the I/O bus 14. I/O READ DATA represents the data lines of the I/O bus 14.

FIG. 3 shows the relevant bus signals when a transfer is being made from a device attached to the I/O bus 14 to the system memory 18. First, the IOCC determines the parameters of the transfer, including the starting address on the system bus 12 and the I/O bus 14, and the length of the block to be transferred.

The IOCC 20 then asserts the first address 50 onto the I/O ADDR lines. I/O Sl is then transitioned low 52 to indicate that this is a read cycle from the I/O bus 14. ADL is then transitioned low 54 to latch the address 50 into the I/O slave being addressed.

I/O CMD is transitioned low 56 to begin a bus cycle. I/O ADL is transitioned high 58 at the same time.

Since this is a read cycle on the I/O bus, as indicated by I/O Sl, data is placed onto the data lines by the I/O slave. After the bus cycle is begun with the transition 56 of I/O CMD, the slave device drives the previously tri-stated I/O READ DATA lines with the value of the first data item 60.

The signal I/O Sl is allowed to transition high 62 as is standard on this bus. The values on I/O ADDR are changed 64 in order to place a second read address 66 onto the lines. The bus cycle completes when I/O command transitions high 68, at which time the first data item 60 is read from the I/O bus 14 and latched into an internal register (not shown) of the IOCC 20.

During the first I/O bus cycle, the system bus has been active 70. During this time period 70, the data which is latched into the IOCC 20 is written to the system memory 18. The SYSTEM MEM WRITE active period 70 includes addressing of the system memory 18, changing of control signals, and writing of data onto the system bus 12.

The transfer above has been described as a read of the first data item from the I/O bus 14, followed by latching the data into the IOCC 20 at the transition 68 of I/O COMMAND. This has been described as being followed by a write onto the system bus 12 during the active period 70. In the alternative, it is not necessary to actually latch the data item 60 into a register latch within the IOCC 20. Instead, it is possible for the IOCC 20 to provide a direct connection between the data lines of the I/O bus 14 and the system bus 12. The rising transition 68 of I/O COMMAND, normally used to latch the data items 60 into the IOCC, can instead be used to generate a control signal onto the system bus 12 which causes the data to be immediately written into the system memory 18.

The remaining two data transfers illustrated in FIG. 3 operate in the identical manner. The second data item 72 is transferred on the rising transition 74 of I/O COMMAND, and is written to the system memory 18 during the active bus period 76. The final data item 78, addressed by the third address 80, is written to the system memory 18 during the system bus active period 82 when the I/O COMMAND signal transitions high 84.

As can be seen by the above description, a new data item is read during each bus cycle of the I/O bus 14, and transferred to the system memory 18 in parallel with the data reads. Thus, it is not necessary to read the I/O bus 14 on one clock cycle, and generate a write cycle on the system bus 12 on the following system clock cycle.

Figure 4:
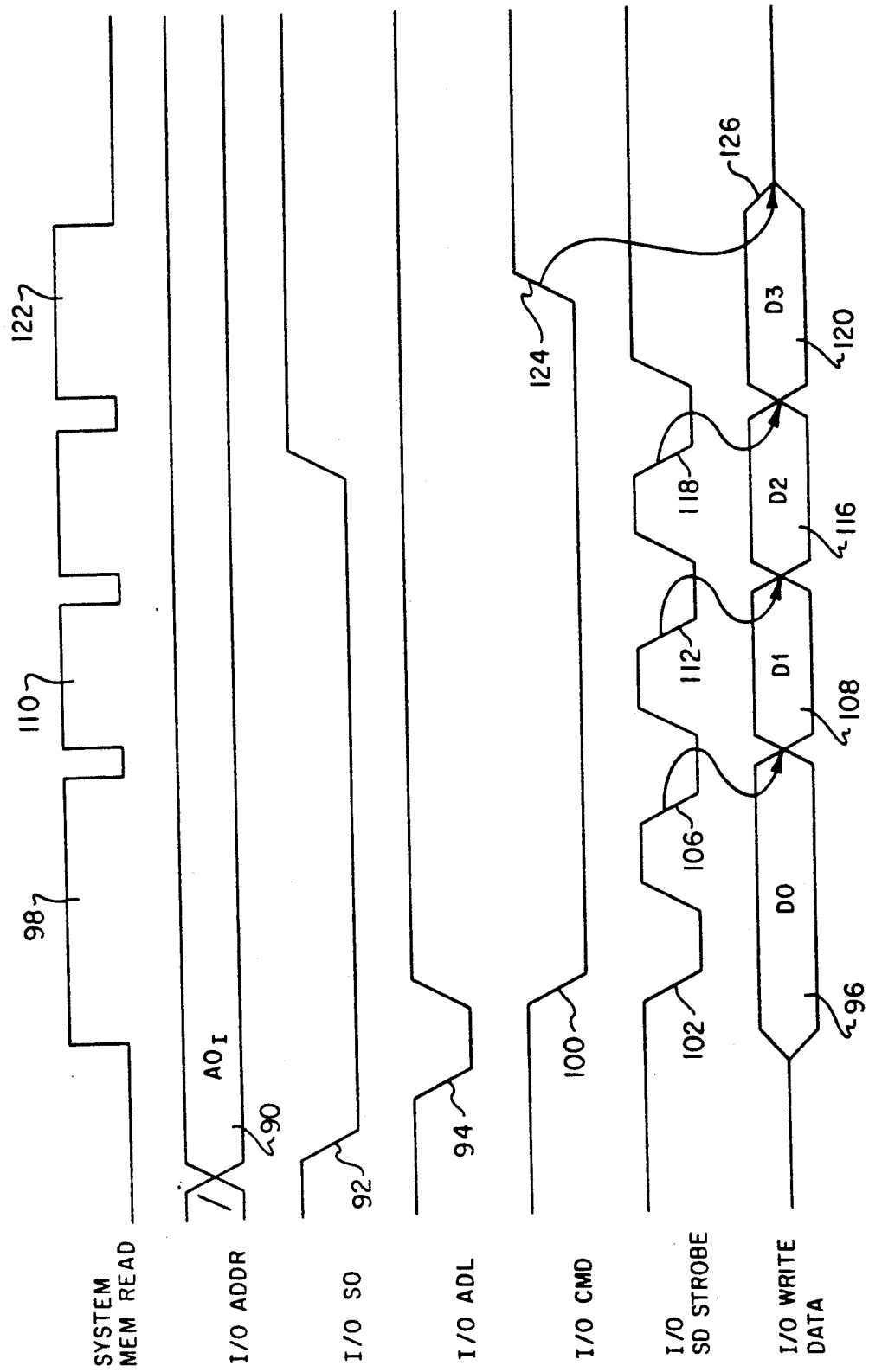
FIG. 4 is a timing diagram illustrating a high speed block data transfer according to the present invention.

FIG. 4 shows a high speed data transfer using a protocol referred to as a streaming data transfer. The functioning of streaming data transfers is described in detail in copending patent applications Ser. No. 07/297,773, titled HIGH SPEED DATA TRANSFER ON A COMPUTER SYSTEM BUS, and Ser. No. 07/297,772, titled DATA TRANSFER USING BUS ADDRESS LINES, both copending herewith and assigned to the assignee hereof. FIG. 4 includes only those signals necessary to illustrate how a streaming data transfer on the I/O bus 14 can be used to make a block transfer of data into the system memory 18. Additional control signals, necessary to the transfer but not to its understanding in terms of the present invention, are described in the above cited copending applications.

FIG. 4 illustrates a transfer from system memory 18 to a slave device attached to the I/O bus 14. This involves a read from system memory 18 on the system bus 12, and a write to the I/O slave on the I/O bus 14. The I/O signals are the same as those shown in FIG. 3, except that I/O S0 has been substituted for I/O S1. I/O S0 is used to indicate that a write operation is being performed to a device attached to the I/O bus 14.

The IOCC 20 begins the block data transfer by asserting the starting address 90 onto the signal lines I/O ADDR. Next, I/O S0 is transitioned low to indicate that this transfer is a write transfer on the I/O bus 14. Next, I/O ADL is transitioned low to latch the address 90 into the I/O slave device as described above.

The data lines of the I/O bus 14, represented by I/O WRITE DATA, are activated by the IOCC 20. The first data item 96 is placed onto I/O WRITE DATA when it is available from system bus 12. During a system bus active period 98, the first data item is read from system memory 18 and made available to the IOCC 20. As described above in connection with FIG. 3, the value read from the system bus 12 can be latched into a buffer internal to the IOCC, then made available to the I/O bus 14. In the alternative, the data item 96 can be connected directly from the system bus 12 to the I/O bus 14.

The transfer cycle actually begins when I/O COMMAND transitions low 100. The signal I/O SD STROBE is transitioned low 102 at the same time. As described in more detail in copending application Ser. No. 07/297,773, incorporated by reference, the signal I/O SD STROBE is a separate high speed clock signal dedicated to block data transfers using the streaming data protocol.

The first data item 96 is transferred from the IOCC 20 to the I/O bus 14 at the second falling transition 106 of I/O SD STROBE. Once the data is transferred, a next data item 108 is read from the system bus 12 during the next system bus active cycle 110 and transferred to the I/O bus 14 during the falling transition 112 of I/O SD STROBE.

This process can continue for any number of data cycles until the next to last data cycle. The next to last data item 116 is transferred to the I/O bus 14 on the last falling transition 118 of I/O SD STROBE. After the next to last data item 116 is transferred, the last data item 120 is transferred to I/O WRITE DATA after being read from the system memory 18 during system bus active period 122.

The last data item 120 is transferred to the I/O bus 14 by the rising transition 124 of I/O COMMAND. After a sufficient delay to allow the I/O slave device attached to the I/O bus 14 to read and latch the last data item 120, the data buffers on the I/O bus 14 are tri-stated 126 by the IOCC 20.

The system and method described above allow for efficient block transfer of data between the system memory 18 attached to the system bus 12, and an I/O slave device 22, 24 attached to the I/O bus 14. One data item is transferred on each bus during each clock cycle. The technique described herein accommodates the use of a high speed streaming data protocol on the I/O bus 14, which can greatly increase the block transfer rate of data through the IOCC 20.

The present invention has been illustrated by the system and method described above, and it will become apparent to those skilled in the art that various changes and modification may be made thereto. Such modification fall within the scope of the present invention, which is defined by the appended claims.

We claim:

1. A system for transferring data in a digital computer system, comprising:
   a first bus having address lines, data lines, and control lines;
   a second bus having address lines, data lines, and control lines;
   a master subsystem connected to the first bus;
   a slave subsystem connected to the second bus;
   controller means connected to the first and second busses for transferring addresses, data and control signals between the first bus and the second bus;
   a clock line in the second bus for communicating a normal clock signal;
   a high speed line in the second bus for communicating a high speed clock signal, wherein the second bus high speed clock signal has a higher frequency than the second bus normal clock signal;
   a high speed line in the first bus for communicating a high speed clock signal, wherein the first bus high speed clock signal has the same frequency as the second bus high speed clock signal;
   a transfer rate line in the first bus for communicating a transfer rate signal;
   a transfer rate line in the second bus for communicating a transfer rate signal, wherein the first and second bus transfer rate lines are connected together through the controller means;
   first means in the slave subsystem for signalling on the second bus transfer rate line whether the slave subsystem can support a high speed data transfer, wherein the signal on the second bus transfer rate line is communicated to the first bus transfer rate line;
   second means in the master system for detecting, from the first bus transfer rate line, whether the slave subsystem can support a high speed data transfer; and
   third means for, if the slave system can support a high speed data transfer, generating a high speed clock signal on the first bus high speed line and on the second bus high speed line, and transferring data between the master subsystem and the slave subsystem under the control of the first and second bus high speed clock signals, and for, if the slave system cannot support a high speed data transfer, transferring data between the master subsystem and the controller means over the first bus, and transferring data between the controller means and the slave subsystem over the second bus under the control of the normal clock signal.

2. The system of claim 1, wherein the data transfer between the master subsystem and the slave subsystem is a block data transfer comprising a plurality of consecutive data items.

3. The system of claim 1, further comprising:
a ready line in the first bus and in the second bus, connected together in the controller means, for communicating a ready signal under the control of the slave subsystem, wherein, if the slave subsystem can support high speed data transfers, data is transferred under the control of the first and second bus high speed clock signals when the ready signal indicates that the slave subsystem is ready to transfer data, and wherein data transfer is suspended when the ready signal indicates that the slave subsystem is not ready to transfer data.

4. The system of claim 1, further comprising:
a control line in the first bus and in the second bus, connected together in the controller means, for communicating a transfer mode signal, wherein data is transferred between the master subsystem and the slave subsystem on the data lines when the transfer mode signal indicates a first mode, and wherein data is transferred between the master subsystem and the slave subsystem on the data lines and on at least one of the address lines when the transfer mode indicates a second mode.

5. The system of claim 1, further comprising:
a clock line in the first bus for communicating a normal clock signal having the same frequency as the second bus normal clock signal, wherein the third means, if the slave subsystem cannot support a high speed data transfer, transfers data between the master subsystem and the controller means under the control of the first bus normal clock signal.

6. A system for transferring data in a digital computer system, comprising:
a first bus having address lines, data lines, and control lines;
a second bus having address lines, data lines, and control lines;
a slave subsystem connected to the first bus;
a master subsystem connected to the second bus;
controller means connected to the first and second busses for transferring addresses, data and control signals between the first bus and the second bus;
a clock line in the second bus for communicating a normal clock signal;
a high speed line in the second bus for communicating a high speed clock signal, wherein the second bus high speed clock signal has a higher frequency than the second bus normal clock signal;
a high speed line in the first bus for communicating a high speed clock signal, wherein the first bus high speed clock signal has the same frequency as the second bus high speed clock signal;
a transfer rate line in the first bus for communicating a transfer rate signal;
a transfer rate line in the second bus for communicating a transfer rate signal, wherein the first and second bus transfer rate lines are connected together through the controller means;
first means in the slave subsystem for signalling on the first bus transfer rate line whether the slave subsystem can support a high speed data transfer, wherein the signal on the first bus transfer rate line is communicated to the second bus transfer rate line;
second means in the master system for detecting, from the second bus transfer rate line, whether the slave subsystem can support a high speed data transfer; and
third means for, if the slave system can support a high speed data transfer, generating a high speed clock signal on the second bus high speed line and on the first bus high speed line, and transferring data between the master subsystem and the slave subsystem under the control of the first and second bus high speed clock signals, and for, if the slave system cannot support a high speed data transfer, transferring data between the master subsystem and the controller means over the first bus under the control of the first bus normal clock signal, and transferring data between the controller means and the slave subsystem over the second bus.

7. The system of claim 6, wherein the data transfer between the master subsystem and the slave subsystem is a block data transfer comprising a plurality of consecutive data items.

8. The system of claim 6, further comprising:
a ready line in the first bus and in the second bus, connected together in the controller means, for communicating a ready signal under the control of the slave subsystem, wherein, if the slave subsystem can support high speed data transfers, data is transferred under the control of the first and second bus high speed clock signals when the ready signal indicates that the slave subsystem is ready to transfer data, and wherein data transfer is suspended when the ready signal indicates that the slave subsystem is not ready to transfer data.

9. The system of claim 6, further comprising:
a control line in the first bus and in the second bus, connected together in the controller means, for communicating a transfer mode signal, wherein data is transferred between the master subsystem and the slave subsystem on the data lines when the transfer mode signal indicates a first mode, and wherein data is transferred between the master subsystem and the slave subsystem on the data lines and on at least one of the address lines when the transfer mode indicates a second mode.

10. The system of claim 6, further comprising:
a clock line in the first bus for communicating a normal clock signal having the same frequency as the second bus normal clock signal, wherein the third means, if the slave subsystem cannot support a high speed data transfer, transfers data between the slave subsystem and the controller means under the control of the first bus normal clock signal.

* * * * *